United States Patent Office 2,768,181
Patented Oct. 23, 1956

2,768,181
ENDRIN STABILIZATION

Richard H. Bellin, Norbut W. Evans, John D. Marks, and William M. Saltman, Denver, Colo., assignors to Shell Development Company, New York, N. Y., a corporation of Delaware No Drawing. Application May 3, 1954,
Serial No. 427,368

22 Claims. (Cl. 260—348)

This invention pertains to a method for stabilizing octahydro-endo,endo-dimethanonaphthalene compounds containing halogen substituents. More particularly, the invention pertains to a method for stabilizing 6,7-epoxy-1, 2, 3, 4, 10-hexachloro-1,4,4a,5,6,7,8,8a-octahydro-1,4,5,8-endo,endo-dimethanonaphthalene. The invention also pertains to the new and stable compositions which for the first time now are provided by the present invention.

Epoxy-substituted octahydro-endo,endo-dimethanonaphthalene compounds containing halogen substituents, such as 6,7-epoxy-1,2,3,4,10,10-hexachloro-1,4,4a,-5,6,7,8,8a-octahydro-1,4,5,8-endo,endo-dimethanonaphthalene, have recently been made known and have been found to have considerable value as insecticides. Serious difficulties have been encountered in the production and use of these compounds, however, owing to their chemical instability. These difficulties have been particularly serious with 6,7-epoxy-1,2,3,4,10,10-hexachloro-1,4,4a,5,6,7,8,8a-octahydro-1,4,5,8-endo,endo-dimethanonaphthalene. Like certain of their insecticidal properties, the chemical instability of these halogen-substituted octahydro-endo,endo-dimethanonaphthalene compounds appears to be attributable in large measure to their particular stereochemical configuration, and not merely to the nature of the substituent groups and atoms which are present. For example, under conditions where 6,7-epoxy-1,2,3,4,10,10-hexachloro-1,4,4a,5,6,7,-8,8a-octahydro-1,4,5,8-endo,endo-dimethanonaphthalene undergoes irreversible, substantially complete conversion in but a few hours to products having little if any insecticidal activity, even as closely related a compound as 6,7-epoxy-1,2,3,4,10,10-hexachloro-1,4,4a,5,-6,7,8,8a-octahydro-1,4,5,8-endo,exo-dimethanonaphthalene has been found to be substantially stable.

It is therefore one of the principal objects of this invention to provide means for overcoming the observed chemical instability of the epoxy-substituted octahydro-endo,endo-dimethanonaphthalene compounds containing halogen substituents, especially of 6,7-epoxy-1,2,3,4,10,-10-hexachloro-1,4,4a,5,6,7,8,8a-octahydro-1,4,5,8-endo,endo-dimethanonaphthalene, which at the present time is the most readily available of these compounds.

Other and more specific objects of the invention will be apparent from the accompanying disclosures and claims.

The chemical compound 6,7-epoxy-1,2,3,4,10,10-hexachloro-1,4,4a,5,6,7,8,8a-octahydro-1,4,5,8-endo,endo-dimethanonaphthalene is also known as the epoxide of the Diels-Alder adduct of 1,2,3,4,7,7-hexachlorobicyclo-(2.2.1)-2,5-heptadiene and cyclopentadiene. When pure it is a white crystalline material melting with decomposition at about 245° C. It can be prepared by epoxidation of this Diels-Alder adduct using, for example, peracetic acid as the epoxidizing agent. The 1,2,3,4,7,7-hexachlorobicyclo(2.2.1)-2,5-heptadiene can be prepared in turn by dehydrochlorination of the Diels-Alder adduct of hexachlorocyclopentadiene and vinyl chloride, for example, by treatment with an alcoholic solution of a caustic alkali. The chemical structure of 6,7-epoxy-1,2,3,4,-10,10-hexachloro-1,4,4a,5,6,7,8,8a-octahydro-1,4,-5,8-endo,endo-dimethanonaphthalene can be represented in planar form by the structural formula

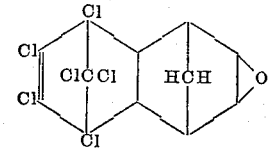

The geometrical configuration can be indicated by the following three-dimensional formula:

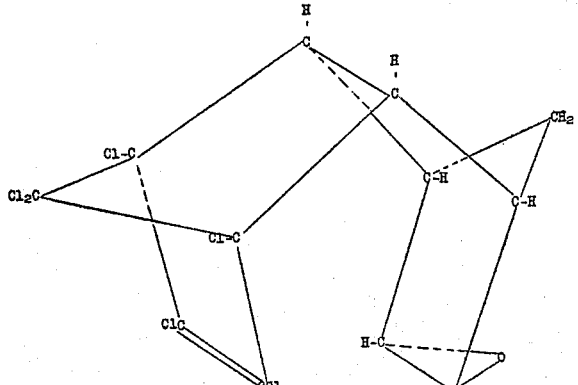

In other halogen-substituted octahydro-endo,endo-dimethanonaphthalene compounds with which the invention is concerned, chlorine shown in the above formulas may be replaced by bromine and/or hydrogen shown in the formulas may be replaced by a substituent group, such as an alkyl group, an ester group, or an alkoxy group. In each case, however, there will be present the six halogen atoms on the one ring and the stereochemical configuration will be the illustrated endo-endo configuration.

When an epoxy- and halogen-substituted octahydro-endo,endo-dimethanonaphthalene compound, such as 6,7-epoxy-1,2,3,4,10,10-hexachloro-1,4,4a,5,6,7,-8,8a-octahydro-1,4,5,8-endo-endo-dimethanonaphthalene, is stored at ambient temperatures or is heated for shorter periods of time at elevated temperatures it undergoes a chemical transition which essentially destroys the valuable insecticidal activity of the compound. This transition reaction has been found to occur even though the compound is in the crystalline form and therefore of a high degree of purity.

As the outgrowth of an investigation of the phenomenon of the chemical instability of 6,7-epoxy-1,2,3,4,10,-10-hexachloro-1,4,4a,5,6,7,8,8a-octahydro-1,4,5,8-endo,endo-dimethanonaphthalene and related compounds, it now has been discovered that there are two factors which, taken together, account for chemical instability of the halogen-substituted octahydro-endo,endo-dimethanonaphthalene compounds. It has been further found that, by obviating the effect of either one of the two factors, substantially improved stabilities may be obtained. By obviating the effects of both factors, greatly increased stabilities are achieved, substantially more than would be anticipated from the effect of obviating either factor individually.

As one of the two factors which have been referred to above, it has been found that the condition of acidity (or alkalinity) of the halogen-substituted octahydro-endo,endo-dimethanonaphthalene compound exerts a pronounced effect upon its stability. For example, in the presence of even minute amounts of strong acid, 6,7-epoxy-1,2,3,4,10,10-hexachloro-1,4,4a,5,6,7,8,8a-octahydro-1,4,5,8-endo,endo-dimethanonaphthalene undergoes rapid and irreversible conversion to substantially insecticidally inert materials. Traces of acid, liberated apparently by spontaneous dehydrohalogenation, tend to accelerate the conversion and, moreover, tend to accelerate the liberation of further quantities of acid. As a result, the transition of the halogen-substituted octahydro-endo,endo-dimethanonaphthalene compound into insecticidally inert materials tends to be autocatalytic. Furthermore, the reaction is an exothermic reaction with the result that in more or less adiabatic systems the heat liberated by the reaction causes still further acceleration of the reaction, sufficient upon occasion to lead to a reaction of almost explosive violence.

It has been discovered that the effect of this factor can be obviated and a product of substantially improved stability obtained, by incorporating a small amount of an alkaline-reacting material with the solid (usually crystalline) halogen-substituted octahydro-endo,endo-dimethanonaphthalene compound. As the alkaline-reacting material there advantageously may be employed an alkali metal hydroxide or an alkaline-reacting salt of an alkali metal, such as a bicarbonate, carbonate, a basic phosphate, acetate, aluminate, citrate, borate or silicate, the alkali metal carbonates being preferred. As the alkali metal hydroxide there may be employed the hydroxide of any of the alkali metals including those of lithium, potassium, sodium, rubidium and cesium although potassium hydroxide and sodium hydroxide are preferred. Salts which may be employed desirably are those which will impart to water when dissolved therein a pH value higher than about pH 6 and preferably above about pH 8, the preferred salts being the alkali metal salts of weak acids, i. e., acids having $pK_a$ values numerically greater than about 3. Specific salts which may be employed include salts of potassium, lithium, sodium, cesium and rubidium and are exemplified but not limited by the following: trisodium phosphate, potassium carbonate, sodium carbonate, sodium borate, lithium carbonate, sodium citrate, potassium borate, sodium silicate, sodium aluminate, potassium acetate, and potassium basic phosphate. Alkaline-reacting compounds of the alkaline earth metals may also be employed, including the hydroxides, oxides, and alkaline-reacting salts of calcium, magnesium, strontium and barium. Magnesium carbonate, calcium acetate, calcium hydroxide, magnesium hydroxide, lime, magnesia and calcium carbonate are included among the alkaline-reacting compounds of the alkaline earth metals which may be employed. A nitrogenous base may be employed, such as urea, thiourea, hexamethylenetetramine, guanidine and its salts with weak, preferably volatile acids, such as guanidine acetate, and guanidine carbonate, benzyltrimethylammonium hydroxide and the various amines, such as the mono-, di-, and trialkyl amines, e. g., triamylamine, trioctylamine, di-2-ethylhexylamine and the like. The preferred alkaline-reacting materials, owing to their more lasting stabilizing action, are those that are essentially non-volatile at ambient temperatures, such as the inorganic salts, oxides, and hydroxides, and the normally solid nitrogenous bases and salts of the same. The amount of the alkaline-reacting material necessary for imparting a substantially improved stability need be but a minor amount based upon the weight of the halogen-substituted octahydro-endo,endo-dimethanonaphthalene compound. In general, amounts of the alkaline-reacting material between about 0.05% and about 25% by weight of the epoxy- and halogen-substituted octahydro-endo,endo-dimethanonaphthalene are employed, a preferred range being about 0.5% to about 5% by weight.

As the second of the two factors which have been referred to above, it has been found that the halogen-substituted octahydro-endo,endo-dimethanonaphthalene compounds with which the invention is concerned are highly susceptible to the presence of minute amounts of iron present in certain chemical forms. Thus, it has been found that the ferric ion acts as a rather specific and very active catalyst for chemical transition of 6,7-epoxy-1,2,3,4,10,10 - hexachloro - 1,4,4a,5,6,7,8,8a-octahydro-1,4,5,8-endo,endo-dimethanonaphthalene and related insecticidally active compounds into insecticidally inert materials. Amounts of the ferric ion even as small as 5 p. p. m. exert a very pronounced deleterious effect.

It also has been discovered that if the ferric ion is combined through coordinate valency linkages with an organic addendum which forms such linkages therewith, it no longer acts as a catalyst for the conversion of the halogen - substituted octahydro - endo,endo - dimethanonaphthalene compounds with which the invention is concerned into insecticidally inert materials. This second factor therefore is obviated according to the invention by incorporating with the halogen-substituted octahydro-endo,endo-dimethanonaphthalene compound a small amount of an additive which forms a penetration complex with the ferric ion; that is to say, a complex of the ferric ion and the addendum united through coordinate linkages stable in aqueous solution. The addendum may be unidentate, as in the case of the ions $CN^-$ and $SCN^-$, or it may be polydentate, or may contain a plurality of electron-donating groups, as is the case where the addendum is one that forms a chelated penetration complex with the ferric ion.

Stabilizing agents which yield unidentate addenda and which may be employed according to the invention include metal cyanides, such as potassium, sodium, lithium and alkali metal and alkaline earth metal cyanides, and the corresponding cyanates and thiocyanates.

Stabilizing agents which yield polydentate addenda and which may be employed in order to obviate this second factor referred to above are compounds characterized in that they chelate the ferric ion. That is to say, they combine with the ferric ion so as to form a chelate ring, i. e., a pentatomic or hexatomic heterocyclic ring containing iron as one of the ring atoms. Stabilizing agents which preferably may be employed in accordance with this aspect of the invention all are polyfunctional, preferably aliphatic, compounds which contain at least two functional groups selected from the class consisting of amino, hydroxyl, and carboxyl, the said two functional groups being separated from each other by from two to three carbon atoms which preferably are arranged in an open-chain structure and which include the carboxyl carbon atom where the functional group is the carboxyl group. Suitable stabilizing agents which may be employed in accordance with this aspect of the invention include oxalic acid and geminate dicarboxylic acids such as malonic acid, ethylmalonic acid, diethylmalonic acid, methylmalonic acid, n-propylmalonic acid, isopropylmalonic acid and phenylmalonic acid. Further suitable stabilizing agents of this character include ethylenediamine and trimethylenediamine and their substitution products such as diacetonediamine, diethylenetriamine, N,N'-diethylethylenediamine, triethylenetetramine, propylenediamine, tris(2-aminoethyl)amine, 1,2,3 - triaminopropane, N(3-amino-2-hydroxypropyl) - 2 - hydroxy-1,3-propanediamine, 2 - hydroxy - 1,3 - propanediamine, and N,N' - bis(3 - amino - 2 - hydroxypropyl) - 2-hydroxy-1,3-propanediamine. Aromatic heterocyclic polyamines having the nitrogens separated by from two to three carbons and in different heterocyclic rings, may also be employed, such as bipyridyl and o-phenanthroline. Stabilizing agents which contain both the amino group and the carboxyl group are typified by the naturally occurring amino acids as well as synthetic alpha- and beta-amino acids, e. g., glycine, alanine, beta-alanine, asparagine, glutamic acid, glycylglycine and phenylalanine. The acids, when employed in accordance with the invention, suitably may be employed in the form of the unneutralized acid or in the partially or wholly neutralized form, such as a sodium, potassium or alkali metal salt (including ammonium). The amino acids which contain but one amino group and but one carboxyl group may also be employed in their neutral or inner salt, or zwitterion, form. The amino acid may contain a plurality of nitrogens and/or a plurality of carboxyl groups, for example, ammonia diacetic acid, ammonia triacetic acid, ethylenediamine-tetra-acetic acid, ammonia dipropionic acid, ethylenediamine dipropionic acid, 1,3-diaminocyclohexane-N,N'-tetra-acetic acid, 3-sulfoaniline diacetic acid, aniline diacetic acid, 4-aminobenzoic acid-N,N-diacetic acid, beta-aminoethylphosphonic acid-N,N-diacetic acid, glycine-N-propionic acid, N-benzylethylenediamine triacetic acid, and methylamine-N,N-diacetic acid.

Especially desirable stabilizing agents which may be employed in accordance with the invention are those which have been found to obviate both of the two factors which have been referred to previously. By employing these preferred stabilizers, the incorporation of but a small amount, preferably not over about 5% by weight, of the single stabilizing agent in or with the solid halogen-substituted octahydro - endo,endo-dimethanonaphthalene compound provides compositions which are noteworthy for their stability under conditions encountered during manufacture and storage or shipment of the halogen-substituted octahydro - endo,endo-dimethanonaphthalene compound. The particularly preferred stabilizing agents of this character are aliphatic polyfunctional compounds which contain amino nitrogen, the carboxyl group, and the hydroxyl group and in which the functional groups are located in beta positions, or are each separated by two carbon atoms, inclusive of carboxyl carbon, from the next adjacent functional group. More particularly, the preferred stabilizers can be defined by means of the structural formula

in which R represents a 2-hydroxyalkyl group, R' represents one of the class consisting of 1-carboxyalkyl and 1-metalloxyalkyl, the metal being alkali metal (including ammonium) and R" is one of the class consisting of hydrogen, 2-hydroxyalkyl, 1-carboxyalkyl, 1-metalloxyalkyl, the metal being alkali metal (including ammonium), and the groups represented by the formula

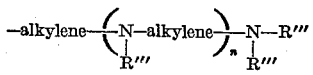

in which alkylene denotes a 1,2-alkylene group, each R''' is one of the class consisting of hydrogen, 2-hydroxyalkyl and R', and $n$ is 0 or a low integral number. Illustrative preferred stabilizing agents which conform to this structural formula include N-2-hydroxyethyl-iminodiacetic acid, N,N'-di-hydroxyethyl-ethylenediamine-diacetic acid, N - hydroxyethyl - ethylenediamine-triacetic acid, N,N,N'-tri-hydroxyethylethylenediamine-acetic acid, and N,N',N''-tri-hydroxyethyl-diethylenetriamine-diacetic acid. Especially desirable as the stabilizing agent is N,N-di-hydroxyethyl glycine having the structural formula

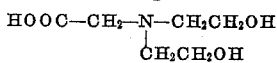

which preferably is employed in the form of an alkali metal salt.

The stabilizing agents may be incorporated with the halogen-substituted octahydro-endo,endo-dimethanonaphthalene compound by any suitable method to provide the novel compositions of the invention. Where the halogen-substituted octahydro - endo,endo-dimethanonaphthalene compound is present as a solid, such as a flaked product or a crystalline material, the stabilizing agent may be incorporated by dry mixing, or by blending a solution of the stabilizing agent in a preferably volatile solvent with the solid halogen-substituted octahydro-endo,endo-dimethanonaphthalene compound and thereafter permitting the solvent to evaporate. A particularly effective method, which has been employed with advantage in the preparation of stable crystalline 6,7-epoxy-1,2,3,4,10,10 - hexachloro - 1,4,4a,5,6,7,8,8a - octahydro-1,4,5,8-endo,endo-dimethanonaphthalene (endrin), is to add the stabilizing agent to a solution of the halogen-substituted octahydro-endo,endo - dimethanonaphthalene in an organic solvent for such compound and to crystallize the halogen-substituted octahydro-endo,endo-dimethanonaphthalene compound from solution in the presence of the added stabilizing agent. It appears that the stabilizing agent is occluded in the crystals of the epoxy- and halogen-substituted octahydro-endo,endo-dimethanonaphthalene compound and that this occlusion may account for the remarkable stabilities which have been obtained by proceeding in this manner. The solvent may be, for example, benzene, toluene, carbon tetrachloride, iso-octane or other inert volatile organic solvent for the epoxy- and halogen-substituted octahydro-endo,endo-dimethanonaphthalene compound. The concentration of the epoxy- and halogen-substituted octahydro-endo,endo-dimethanonaphthalene compound in the solution may vary between about 10 and 40%, although these figures are not critical. The stabilizing agent is added to the solution in an amount preferably between about 0.5 and about 5% based upon the solids content of the solution. The crystallization of the epoxy- and halogen-substituted octahydro-endo,endo-dimethanonaphthalene compound in the presence of the added stabilizing agent may be carried out by conventional methods, such as by concentrating the solution through evaporation and cooling the concentrated solution to bring about crystallization. The crystallization, of course, may be carried out either batch-wise or continuously.

The amount of stabilizing agent incorporated, regardless of the method of incorporation used, generally should be within the range of from about 0.05% to about .15% by weight of the halogen-substituted octahydro-endo,endo-dimethanonaphthalene compound, and preferably is within the range of from about 0.1% to about 5% by weight of the halogen-substituted octahydro,endo,endo-dimethanonaphthalene compound. Where the halogen-substituted octahydro-endo,endo-dimethanonaphthalene compound to be stabilized is technical endrin, and the stabilizer is N,N-di-2-hydroxyethyl glycine or a salt of the same, notably effective results have been obtained with amounts of the stabilizer between about 0.1% and about 1% by weight of the technical endrin.

The stabilizing agents may be employed in solid form, which is the way some of the materials will be commercially obtainable, or they may be employed in the form of solutions in water or an organic solvent, others being more readily obtainable in this form.

The novel, stable, solid (crystalline) compositions of this invention, consisting essentially of the halogen-substituted octahydro-endo,endo-dimethanonaphthalene compound and the stabilizing agent or stabilizing agents may be stored with notably greater safety than can the same unstabilized halogen-substituted octahydro-endo,endo-dimethanonaphthalene compounds in the absence of stabilizing agents. The new compositions may be employed for the preparation of insecticidal dusts, wettable powders, sprays (which may be simple solutions or may be polyphase compositions, e. g., emulsions) by methods already known for the preparation of insecticidal compositions from these halogen-substituted octahydro-endo,endo-dimethanonaphthalene compounds. The insecticidal compositions prepared from the novel compositions of this invention have notably increased stabilities in compounding, storage, shipment and use. The presence of the stabilizing agent has been found to exert no deleterious effect as to insecticidal or other properties.

The following examples will serve to illustrate the invention, it being understood that the examples should not be misconstrued as limiting the scope of the invention defined by the hereto appended claims.

Example I

To a sample of recrystallized 6,7-epoxy-1,2,3,4,10,10-hexachloro-1,4,4a,5,6,7,8,8a-octahydro-1,4,5,8 - endo,endo-dimethanonaphthalene there was added 5% by weight of solid sodium carbonate and the mixture was well blended. A sample of the mixture was placed in a 22 x 175 mm. glass test tube and the test tube was suspended in a constant temperature bath maintained at 100° C. In a second like test tube suspended in the bath there was placed a sample of the crystalline 6,7-epoxy-1,2,3,4,10,10-hexachloro-1,4,4a,5,6,7,8,8a-octahydro-1,4,5,8-endo - endo-dimethanonaphthalene with no additive. While the two samples were maintained at 100° C. small portions of each sample were withdrawn at intervals and analyzed for their content of 6,7-epoxy-1,2,3,4,10,10-hexachloro-1,4,4a,5,6,7,8,8a-octahydro-1,4,5,8-endo,endo - dimethanonaphthalene by infrared analysis. The results shown in the following table were obtained:

| Time of Heating, Hours | Content of 6,7-Epoxy-1,2,3,4,10,10-Hexachloro-1,4,4a,5,6,7,8,8a-Octahydro-1,4,5,8-Endo,Endo-Dimethanonaphthalene, percent By Weight | |
|---|---|---|
| | 6,7-Epoxy-1,2,3,4,10,10-Hexachloro-1,4,4a,5,6,7,8,8a-Octahydro-1,4,5,8-Endo,Endo-Dimethanonaphthalene +5%Na$_2$CO$_3$ | Control |
| 0 | 90.9 | 94.2 |
| 20 | 88.0 | |
| 25 | | 92.6 |
| 45 | 84.4 | |
| 50 | | 39.7 |
| 69 | 86.0 | |
| 76 | | 2.4 |
| 92 | 86.0 | |
| 116 | 83.5 | |

Example II

To a sample of technical endrin (89.3% by weight 6,7-epoxy - 1,2,3,4,10,10 - hexachloro - 1,4,4a,5,6,7,8,8a-octahydro-1,4,5,8 - endo,endo - dimethanonaphthalene; 8 p. p. m. iron) there was added by dry mixing 10% by weight of potassium hydroxide. The potassium hydroxide was added to the solid endrin in the form of a methanol solution and after mixing the methanol was evaporated. The sample then was placed in a one-half pint vacuum jacketed thermos liner and a sensitive thermocouple was inserted below the surface of the sample. The sample was heated to 75° C. by immersion of the container in a constant temperature bath and the temperature of the sample was measured through the thermocouple by means of a calibrated recording potentiometer. There was no noticeable evolution of heat within the sample. The sample was maintained at 75° C. for 270 hours. At the end of this time the content of 6,7-epoxy-1,2,3,4,10,10-hexachloro-1,4,4a,5,6,7,8,8a-octahydro-1,4,5,8 - endo,endo-dimethanonaphthalene (determined by infrared analysis) was 70.9% by weight.

When the experiment was repeated using a further quantity of the same lot of endrin but without addition of stabilizer the temperature of the sample began to rise spontaneously and rapidly once the sample had been heated to 65–75° C. and continued to rise spontaneously until a maximum temperature of about 260–280° C. was attained. By infrared analysis the content of 6,7-epoxy-12,3,4,10,10-hexachloro - 1,4,4a,5,6,7,8,8a - octahydro-1,4,5,8-endo,endo-dimethanonaphthalene was found to have decreased to below 5% after 6–7 hours heating.

Example III

A solution of technical endrin in benzene, containing about 20% by weight of technical endrin, was washed by shaking with water and the separated organic phase then was filtered through cotton to remove remaining traces of water. The filtrate contained less than about 2 parts per million of iron based on the solids content. To a portion of the filtered benzene solution there was added 1% by weight of thiourea based upon the solids content of the solution. The benzene then was removed by evaporation to obtain solid technical endrin stabilized by thiourea intimately admixed therewith.

A portion of the stabilized solid endrin was stored in a glass container at 100° C. The sample was analyzed periodically during the time of storage at 100° C., utilizing the absorption spectrum in the infrared to determine the content of 1,8,9,10,11,11-hexachloropentacyclo (6.2.1.1$^{3,6}$.0$^{2,7}$.0$^{4,10}$)dodecan-5-one in the sample. This latter product is a primary decomposition product of endrin. Its concentration in the sample affords a convenient measure of the extent of decomposition of the endrin.

After 11 days storage of the stabilized solid technical endrin at 100° C. the content of 1,8,9,10,11,11-hexachloropentacyclo(6.2.1.1$^{3,6}$.0$^{2,7}$.0$^{4,10}$)dodecan-5-one was found to be 3%.

For purposes of comparison, a second portion of solid technical endrin was prepared by the same method except that addition of the stabilizer was omitted. Upon heating at 100° C. the content of 1,8,9,10,11,11-hexachloropentacyclo(6.2.1.1$^{3,6}$.0$^{2,7}$.0$^{4,10}$)dodecan-5-one in this unstabilized sample rose to 8.8% at the end of 24 hours heating and to 72.1% at the end of 48 hours heating.

Example IV

This example illustrates the use of urea as the stabilizing agent.

In one series of tests there were employed further portions of the washed and filtered benzene solution of technical endrin described in the preceding example (solution A). In another test there was employed a solution of technical endrin in benzene, the washing and filtration being omitted (solution B). The iron content of solution B was about 20 parts per million based on the solids content.

Urea was added to each of the test solutions in the amounts shown in the following table. The solutions then were evaporated to dryness and the stability of the solid technical endrin was determined as in the preceding example. The results are shown in the following table:

| Amount of Urea, percent w., Based on the Technical Endrin | Solution | Time of Heating at 100° C. | Percent Decomposition of Endrin |
|---|---|---|---|
| none | A | 24 hours | [1] 8.8 |
| none | A | 48 hours | [1] 72.1 |
| none | B | 22 hours | 100 |
| 1 | A | 25 days | [1] 3 |
| 0.5 | B | 22 days | [1] 3 |

[1] Percent conversion to 1, 8, 9, 10, 11, 11 - hexachloropentacyclo-(6.2.1.1$^{3,6}$.0$^{2,7}$.0$^{4,10}$)dodecan-5-one as determined by infrared analysis.

Example V

To a sample of the endrin employed in Example II there was added 10% by weight of urea and the mixture was thoroughly blended by dry mixing. When tested in the manner described in Example II there was no noticeable evolution of heat. The heating was continued until the content of 6,7 - epoxy-1,2,3,4,10,10-hexachloro-1,4,4a,5,6,7,8,8a-octahydro - 1,4,5,8-endo,endo - dimethanonaphthalene in the sample had decreased to 37.8% by weight. This required 315 hours. Without addition of urea, the 6,7-epoxy-1,2,3,4,10,10-hexachloro-1,4,4a,5,6,-7,8,8a-octahydro-1,4,5,8 - endo,endo - dimethanonaphthalene contained in this lot of endrin decomposed to a content less than 5% in 6–7 hours.

Example VI

To a further portion of the technical endrin employed in Example II there was added 5% by weight of potassium thiocyanate as stabilizer. The stabilizer was incorporated by dissolving the endrin in acetone, adding the potassium thiocyanate to the solution and evaporating the solvent in the presence of the added potassium thiocyanate. Upon heating the stabilized sample at 75° C. and removing samples periodically by infrared analysis, the results shown in the following table were obtained:

| Time of Heating, Hours | Content of 6,7-Epoxy-1,2,3,4,10,10-Hexachloro-1,4,4a,5,6,7,8,-8a-Octahydro-1,4,-5,8 Endo, Endo - Dimethanonaphthalene, Percent By Weight |
|---|---|
| 0 | 84.7 |
| 168 | 80.9 |
| 400 | 84.1 |
| 600 | 71.5 |
| 900 | 70.3 |

Example VII

To a further portion of the washed and filtered benzene solution of endrin described in Example III there was added as the stabilizer 1% by weight of potassium thiocyanate based upon the solids content of the solution. The solution was then evaporated to dryness and the stabilized solid technical endrin, containing the added potassium thiocyanate as stabilizer, was heated at 100° C. until the content of 1,8,9,10,11,11-hexachloropentacyclo(6.2.1.1$^{3,6}$.0$^{2,7}$.0$^{4,10}$)dodecan-5-one, determined by infrared analysis, had risen to 3% by weight. This required 6 days heating. Without added stabilizer the content of 1,8,9,10,11,11-hexachloropentacyclo(6.2.1.1$^{3,6}$.0$^{2,7}$.0$^{4,10}$)dodecan-5-one in a control sample of this technical endrin rose to 8.8% after only 24 hours heating at 100° C. showing, by comparison with the stabilized sample, the marked improvement that is provided by the present invention.

Example VIII

The technical endrin used in this experiment had a purity of about 95%. When heated at 100° C. a sample decomposed spontaneously to carbonaceous materials within 15 minutes. A further sample, however, was successfully stabilized using the tetrasodium salt of ethylene-diaminetetra-acetic acid. The stabilizer was incorporated by dissolving the technical endrin in benzene and adding to the solution about 0.6% by weight of a 27% by weight aqueous solution of the tetrasodium salt of ethylenediaminetetra-acetic acid based on the technical endrin. The resulting mixture was washed with water, the phases were separated, and the stabilized endrin was recovered by evaporation of the benzene from the separated organic phase. A sample of the stabilized endrin, which contained residual amounts of the stabilizing agent not removed by the water washing, was heated at 100° C. There was no visible evidence of decomposition. After 5 days at 100° C., the content of 1,8,9,10,11,11-hexachloropentacyclo(6.2.1.1$^{3,6}$.0$^{2,7}$.0$^{4,10}$)dodecan-5 - one in the sample, as measured by infrared spectroscopy, had not exceeded 3%, evidencing the markedly enhanced stability that was obtained.

Example IX

This example describes two additional experiments utilizing the tetrasodium salt of ethylenediaminetetra-acetic acid as the stabilizing agent. Two different samples of technical endrin were used. To separate solutions of the respective samples in benzene there was added an aqueous 27% by weight solution of the stabilizer and the benzene then was removed by evaporation. The resulting stabilized solid samples were heated at 100° C. and the content of 1,8,9,10,11,11-hexachloropentacyclo(6.2.1.1$^{3,6}$.0$^{2,7}$.0$^{4,10}$)dodecan-5-one was determined periodically by infrared spectroscopy. The time required for the content of this conversion product to reach 3% was noted and these results together with the results obtained in control tests (no stabilizer added) are shown in the following table:

| Technical Endrin Sample | Fe Content, p. p. m. | Amount of Stabilizer Added (27% w. aq. Solution) | Stability, Days [1] |
|---|---|---|---|
| I | <2 | 0.6 | 33 |
| I | <2 | none | <1 |
| II | 20 | 1.0 | 19 |
| II | 20 | none | <1 |

[1] Time at 100° C. when the content of 1,8,9,10,11,11-hexachloropentacyclo(6.2.1.1$^{3,6}$.0$^{2,7}$.0$^{4,10}$)dodecan-5-one had risen to 3% by weight.

Example X

To a further sample of the technical endrin employed in Example VIII there was added 1% by weight, based upon the endrin, of N,N-di-2-hydroxyethyl gylcine (sodium salt). The stabilizer was added by the method used in Example VIII. The decomposition time of this sample, determined by the method employed in Example VIII, was 41 days.

Example XI

To a solution of endrin in benzene there was added 0.4% by weight, based upon the weight of endrin, of N,N-di-2-hydroxyethyl glycine (sodium salt). The resulting mixture was diluted with water, the phases were separated, the organic phase filtered through cotton, an additional 0.6% by weight, based upon the endrin, of N,N-di-2-hydroxyethyl glycine was added to the filtrate, and the benzene was removed by evaporation. Upon heating the stabilized endrin at 100° C. there was no observed decomposition after heated for 31 days. Seventy days heating at 100° C. was required before the content of 1,8,9,10,11,11-hexachloropentacyclo-(6.2.1.1$^{3,6}$.0$^{2,7}$.0$^{4,10}$)dodecan-5-one had risen to 3% by weight. The same lot of endrin, without stabilization, spontaneously decomposed to carbonaceous material within 15 minutes at 100° C.

Example XII

A solution of endrin in benzene was prepared by epoxidation of 1,2,3,4,10,10-hexachloro-1,4,4a,5,8,8a-hexahydro-1,4,5,8-endo,endo-dimethanonaphthalene in benzene solution using peracetic acid as the epoxidizing agent. Two aliquots of the solution thus prepared were taken. To the first aliquot there was added 0.6% by weight, based upon the solids content of the solution, of N,N-di-2-hydroxyethyl glycine (sodium salt). The resulting solution then was diluted with water, the organic phase was separated by centrifugation, benzene was stripped from the resulting solution and the endrin was crystallized from the resulting concentrated solution, the crystals being separated on a basket centrifuge. The crystalline product analyzed about 90% by weight 6,7-epoxy-1,2,3,4,10,10 - hexachloro - 1,4,4a,5,6,7,8,8a - octahydro-1,4,5,8-endo,endo-dimethanonaphthalene.

A second aliquot of the same solution was treated in an identical manner except that addition of the N,N-di-2-hydroxyethyl glycine was omitted.

A portion of the first lot of crystals, containing the stabilizer, was found to contain less than 3% 1,8,9,10,11,11-hexachloro-pentacyclo(6.2.1.1$^{3,6}$.0$^{2,7}$.0$^{4,10}$)-dodecan-5-one after seven months storage at room temperatures. A second portion of the same lot of crystals contained less than 3% 1,8,9,10,11,11-hexachloropentacyclo-(6.2.1.1$^{3,6}$.0$^{2,7}$.0$^{4,10}$)dodecan-5-one after three weeks storage at 100° C. while a third portion stored at 75° C. was stable, as judged by the same criterion, for 124 days. In none of these portions was there visible evidence of decomposition or loss of biocidal activity within the limits of sensitivity of biological assay. The second lot of crystals, containing no stabilizer, contained 60.7% by weight of 6,7-epoxy-1,2,3,4,10,10-hexachloro-1,4,4a,5,6,-7,8,8a-octahydro - 1,4,5,8-endo,endo - dimethanonaphthalene after three weeks storage at room temperature and spontaneously completely decomposed upon heating for 15 hours at 75° C. or for one hour at 100° C.

*Example XIII*

To approximately 20% by weight solutions of different lots of technical endrin in benzene there was added guanidine carbonate in the amounts shown in the following table. The benzene then was evaporated from the solutions. The resulting samples of technical endrin containing the guanidine carbonate intimately dispersed throughout were heated at 100° C. and the content of 1,8,9,10,11,11 - hexachloropentacyclo(6.2.1.1$^{3,6}$.0$^{2,7}$.0$^{4,10}$)-dodecan-5-one was determined periodically by infrared spectroscopy as a measure of the stability. The results obtained together with the results of control experiments (no stabilizer added) are shown in the following table:

| Endrin Sample | | | Stability | |
|---|---|---|---|---|
| Designation | Fe Content, p. p. m. | Guanidine Carbonate, Percent w. | Duration of Heating at 100° C., Days | Content of 1,8,9,10,11,11-Hexachloropentacyclo (6.2.1.1$^{3,6}$.0$^{2,7}$.0$^{4,10}$) dodecan-5-one at Termination of Heating, Percent w. |
| A | ca. 2 | 0.1 | 42 | 3 |
| A | ca. 2 | 0.5 | 73 | 3 |
| A | ca. 2 | 1.0 | >100 | 3 |
| B | 20 | 0.6 | 23 | 3 |
| A | ca. 2 | none | 1 | 8.8 |
| B | 20 | none | <1 | (¹) |

¹ Complete decomposition.

*Example XIV*

A sample of the technical endrin identified in the preceding example as Sample A was stabilized by incorporation of 1% by weight Na₂CO₃ by the method used in the preceding example. It required 28 days heating at 100° C. to increase the content of 1,8,9,10,11,11-hexachloropentacyclo(6.2.1.1$^{3,6}$.0$^{2,7}$.0$^{4,10}$)dodecan-5-one to 3% by weight, compared to the content of 8.8% that resulted upon heating an unstabilized sample of the same lot of technical endrin for 24 hours.

It will be understood that the invention includes other specific embodiments than those that are shown in the preceding examples and, therefore, that the examples should not be misconstrued as imposing on the invention any unnecessary limitations.

We claim as our invention:

1. A composition of matter consisting essentially of a halogen-substituted octahydro-endo,endo-dimethanonaphthalene compound and as stabilizer therefor a stabilizing amount up to 25% by weight of the halogen-substituted octahydro-endo,endo-dimethanonaphthalene of a relatively non-volatile alkaline-reacting material.

2. A composition of matter consisting essentially of a halogen-substituted octahydro-endo,endo-dimethanonaphthalene compound and as stabilizer therefor a stabilizing amount up to 25% by weight of the halogen-substituted octahydro-endo,endo-dimethanonaphthalene of a relatively non-volatile compound characterized in that it forms a penetration complex with the ferric ion.

3. A composition of matter consisting essentially of an epoxy- and halogen-substituted octahydro-endo,endo-dimethanonaphthalene compound and as stabilizer therefor a stabilizing amount up to 25% by weight of the epoxy- and halogen-substituted octahydro-endo,endo-dimethanonaphthalene compound of a relatively non-volatile nitrogen compound of the formula $$R-N-R'$$
$$\quad\;|$$
$$\quad\;R''$$

in which R represents a 2-hydroxyalkyl group which contains at least two carbon atoms, R' represents one of the class consisting of 1-carboxyalkyl and 1-metalloxyalkyl, the metal being alkali metal (including ammonium) and R" is one of the class consisting of hydrogen, 2-hydroxyalkyl containing at least two carbon atoms, 1-carboxyalkyl, 1-metalloxyalkyl, the metal being alkali metal (including ammonium), and the groups represented by the formula

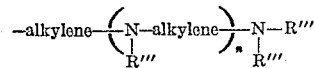

in which alkylene denotes a 1,2-alkylene group, each R''' is one of the class consisting of hydrogen, 2-hydroxyalkyl containing at least two carbon atoms, and R', and n is one, the alkyl portion of the above described groups being a lower alkyl and the above-described alkylene groups being lower alkylene groups.

4. A composition of matter consisting essentially of 6,7 - epoxy - 1,2,3,4,10,10 - hexachloro - 1,4,4a,5,6,7,8,8a-octahydro-1,4,5,8-endo,endo-dimethanonaphthalene and as stabilizer therefor 0.05% to 15% of a relatively non-volatile alkaline-reacting material.

5. A composition of matter consisting essentially of 6,7-epoxy - 1,2,3,4,10,10 - hexachloro - 1,4,4a,5,6,7,8,8a-octahydro-1,4,5,8-endo,endo-dimethanonaphthalene and as stabilizer therefor 0.05% to 15% of a relatively non-volatile compound characterized in that it forms a penetration complex with the ferric ion, said stabilizing compound being an aliphatic polyfunctional compound containing at least two functional groups selected from the group consisting of amino, hydroxyl and carboxyl, the said two functional groups being separated from each other by from two to three carbon atoms which are arranged in an open-chain structure.

6. A composition of matter consisting essentially of 6,7-epoxy - 1,2,3,4,10,10 - hexachloro - 1,4,4a,5,6,7,8,8a-octahydro-1,4,5,8-endo,endo-dimethanonaphthalene and as stabilizer therefor 0.05% to 15% of a relatively non-volatile nitrogen compound of the formula $$R-N-R'$$
$$\quad\;|$$
$$\quad\;R''$$

in which R represents a 2-hydroxyalkyl group which contains at least two carbon atoms, R' represents one of the class consisting of 1-carboxyalkyl and 1-metalloxyalkyl, the metal being alkali metal (including ammonium), and R" is one of the class consisting of hydrogen, 2-hydroxyalkyl containing at least two carbon atoms, 1-carboxyalkyl, 1-metalloxyalkyl, the metal being alkali metal (including ammonium), and the groups represented by the formula

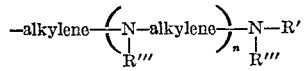

in which alkylene denotes a 1,2-alkylene group, each R''' is one of the class consisting of hydrogen, 2-hydroxyalkyl containing at least two carbon atoms, and R', and n is one, the alkyl portion of the above described groups being a lower alkyl and the above-described alkylene groups being lower alkylene groups.

7. A composition of matter consisting essentially of crystalline 6,7-epoxy-1,2,3,4,10,10-hexachloro-1,4,4a,5,6,7,8,8a - octahydro - 1,4,5,8 - endo,endo - dimethanonaphthalene and as stabilizer therefor from about 0.05% to about 5% by weight of an alkali metal salt of N,N-di-2-hydroxyethyl glycine.

8. A composition of matter defined by claim 7 in which the alkali metal salt of N,N-di-2-hydroxyethyl glycine is occluded within the crystals of said 6,7-epoxy-1,2,3,4,10,10 - hexachloro - 1,4,4a,5,6,7,8,8a - octahydro-1,4,5,8-endo,endo-dimethanonaphthalene.

9. A composition of matter consisting essentially of crystalline 6,7-epoxy-1,2,3,4,10,10-hexachloro-1,4,4a,5,6, 7,8,8a - octahydro - 1,4,5,8 - endo,endo - dimethanonaphthalene and as stabilizer therefor 0.05% to 15% of potassium thiocyanate.

10. A composition of matter consisting essentially of crystalline 6,7-epoxy-1,2,3,4,10,10-hexachloro-1,4,4a,5,6,7,8,8a - octahydro - 1,4,5,8 - endo,endo-dimethanonaphthalene and as stabilizer therefor 0.05% to 15% of a sodium salt of ethylenediaminetetra-acetic acid.

11. A composition of matter consisting essentially of 6,7-epoxy - 1,2,3,4,10,10 - hexachloro - 1,4,4a,5,6,7,8,8a-octahydro-1,4,5,8-endo,endo-dimethanonaphthalene and as stabilizer therefor 0.05% to 15% of an alkali metal carbonate.

12. A composition of matter consisting essentially of a solution of 6,7-epoxy-1,2,3,4,10,10-hexachloro-1,4,4a,5,6,7,8,8a - octahydro-1,4,5,8-endo,endo-dimethanonaphthalene in an organic solvent therefor and as stabilizer therefor 0.05% to 15% of a relatively non-volatile compound characterized in that it chelates the ferric ion.

13. A composition of matter defined by claim 12 in which the added compound is an alkali metal salt of N,N-di-2-hydroxyethyl glycine.

14. A composition of matter consisting essentially of 6,7-epoxy - 1,2,3,4,10,10 - hexachloro - 1,4,4a,5,6,7,8,8a-octahydro-1,4,5,8-endo,endo-dimethanonaphthalene and as stabilizer therefor 0.05% to 15% of hexamethylenetetramine.

15. The method of stabilizing a composition consisting essentially of an epoxy- and halogen-substituted octahydro - endo,endo-dimethanonaphthalene compound which comprises incorporating a stabilizing amount up to 25% by weight of said epoxy-hexachloro-octahydro-endo,endo-dimethanonaphthalene of a relatively non-volatile alkaline-reacting material in said composition.

16. The method of stabilizing a composition consisting essentially of an epoxy- and halogen-substituted octahydro-endo,endo - dimethanonaphthalene compound which comprises incorporating in said composition a stabilizing amount up to 25% by weight of the epoxy- and halogen-substituted octahydro-endo,endo-dimethanonaphthalene compound of a relatively non-volatile compound characterized in that it forms a penetration complex with the ferric ion, said stabilizing compound being an aliphatic polyfunctional compound containing at least two functional groups selected from the group consisting of amino, hydroxyl and carboxyl, the said two functional groups being separated from each other by from two to three carbon atoms which are arranged in an open-chain structure.

17. The method of stabilizing a composition consisting essentially of an epoxy- and halogen-substituted octahydro-endo,endo-dimethanonaphthalene compound which comprises incorporating in said composition a stabilizing amount up to 25% by weight of the halogen-substituted octahydro-endo,endo-dimethanonaphthalene of a relatively non-volatile nitrogen compound of the formula

in which R represents a 2-hydroxyalkyl group which contains at least two carbon atoms, R' represents one of the class consisting of 1-carboxyalkyl and 1-metalloxyalkyl, the metal being alkali metal (including ammonium) and R" is one of the class consisting of hydrogen, 2-hydroxyalkyl containing at least two carbon atoms, 1-carboxyalkyl, 1-metalloxy-alkyl, the metal being alkali metal (including ammonium), and the groups represented by the formula

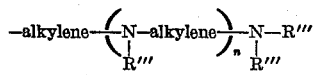

in which alkylene denotes a 1,2-alkylene group, each R''' is one of the class consisting of hydrogen, 2-hydroxyalkyl containing at least two carbon atoms, and R', and n is one, the alkyl portion of the above described groups being a lower alkyl and the above-described alkylene groups being lower alkylene groups.

18. The method of stabilizing crystalline 6,7-epoxy-1,2,3,4,10,10 - hexachloro - 1,4,4a,5,6,7,8,8a - octahydro-1,4,5,8 - endo,endo-dimethanonaphthalene which comprises adding to a solution consisting essentially of the 6,7-epoxy - 1,2,3,4,10,10 - hexachloro - 1,4,4a,5,6,7,8,8a-octahydro-1,4,5,8-endo,endo-dimethanonaphthalene dissolved in an organic solvent therefor 0.05% to 15%, based upon the 6,7-epoxy-1,2,3,4,10,10-hexachloro-1,4,4a,5,6,7,8,8a-octahydro - 1,4,5,8 - endo,endo-dimethanonaphthalene, of a compound characterized in that it forms a penetration complex with the ferric ion and crystallizing 6,7-epoxy-1,2,3,4,10,10-hexachloro-1,4,4a,5,6,7,8,8a-octahydro-1,4,5,8 - endo,endo - dimethanonaphthalene from the solution containing said added compound.

19. The method defined by claim 18 in which the added compound is a nitrogen compound of the formula

in which R represents a 2-hydroxyalkyl group which contains at least two carbon atoms, R' represents one of the class consisting of 1-carboxyalkyl and 1-metalloxyalkyl, the metal being alkali metal (including ammonium) and R" is one of the class consisting of hydrogen, 2-hydroxyalkyl containing at least two carbon atoms, 1-carboxyalkyl, 1-metalloxyalkyl, the metal being alkali metal (including ammonium), and the groups represented by the formula

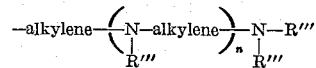

in which alkylene denotes a 1,2-alkylene group, each R''' is one of the class consisting of hydrogen, 2-hydroxyalkyl containing at least two carbon atoms, and R', and n is one, the alkyl portion of the above-described groups being a lower alkyl and the above-described alkylene groups being lower alkylene groups.

20. The method defined by claim 18 in which the added compound is an ammonium salt of N,N-di-2-hydroxyethyl glycine.

21. A composition of matter consisting essentially of an epoxy and halogen-substituted octahydro-endo,endo-dimethanonaphthalene compound and as a stabilizer therefor, a stabilizing amount up to 25% by weight of the epoxy- and halogen-substituted octahydro-endo,endo-dimethanonaphthalene compound of a relatively non-volatile material of the group consisting of inorganic salts and hydroxides, solid organic nitrogeneous bases and their salts and amino acids and their alkali metal and ammonium salts.

22. A method of stabilizing an epoxy and halogen-substituted octahydro - endo,endo-dimethanonaphthalene compound which comprises adding thereto a stabilizing amount up to 25% by weight of the epoxy- and halogen-substituted octahydro - endo,endo-dimethanonaphthalene compound of a relatively non-volatile material of the group consisting of inorganic salts and hydroxides, solid organic nitrogeneous bases and their salts and amino acids and their alkali metal and ammonium salts.

References Cited in the file of this patent

UNITED STATES PATENTS 2,676,132    Bluestone _____ Apr. 20, 1954

OTHER REFERENCES

Agricultural Chemicals 7:67 (September 1952).